(12) United States Patent
Konik et al.

(10) Patent No.: US 9,679,013 B2
(45) Date of Patent: *Jun. 13, 2017

(54) GENERATING AND ACCESSING A DATA TABLE

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 346 days.

This patent is subject to a terminal disclaimer.

(21) Appl. No.: 14/302,480

(22) Filed: Jun. 12, 2014

(65) Prior Publication Data

US 2015/0363441 A1 Dec. 17, 2015

(51) Int. Cl.
*G06F 17/30* (2006.01)

(52) U.S. Cl.
CPC .... *G06F 17/3048* (2013.01); *G06F 17/30315* (2013.01); *G06F 17/30324* (2013.01); *G06F 17/30457* (2013.01)

(58) Field of Classification Search
CPC combination set(s) only.
See application file for complete search history.

(56) References Cited

U.S. PATENT DOCUMENTS

| 6,366,903 | B1 | 4/2002 | Agrawal et al. | |
|---|---|---|---|---|
| 7,007,006 | B2* | 2/2006 | Zilio | G06F 17/30312 |
| | | | | 707/717 |
| 2007/0073657 | A1 | 3/2007 | Santosuosso | |
| 2007/0239744 | A1 | 10/2007 | Bruno et al. | |
| 2007/0250524 | A1* | 10/2007 | Le | G06F 17/30404 |
| 2008/0086480 | A1* | 4/2008 | Srivastava | G06F 17/30575 |
| 2008/0177700 | A1* | 7/2008 | Li | G06F 17/30312 |
| 2009/0006365 | A1 | 1/2009 | Liu et al. | |
| 2009/0006425 | A1* | 1/2009 | Barsness | G06F 17/30477 |
| 2010/0257153 | A1* | 10/2010 | Day | G06F 17/30442 |
| | | | | 707/715 |
| 2010/0281018 | A1 | 11/2010 | Denuit et al. | |
| 2011/0196857 | A1* | 8/2011 | Chen | G06F 17/30457 |
| | | | | 707/714 |
| 2012/0233148 | A1 | 9/2012 | Chen et al. | |
| 2012/0323929 | A1 | 12/2012 | Kimura et al. | |
| 2013/0173544 | A1 | 7/2013 | Barsness et al. | |
| 2014/0172823 | A1 | 6/2014 | Kaminsky et al. | |

(Continued)

OTHER PUBLICATIONS

Konik et al., "Generating and Accessing a Data Table", U.S. Appl. No. 14/467,312, filed Aug. 25, 2014.

(Continued)

*Primary Examiner* — Shyue Jiunn Hwa
(74) *Attorney, Agent, or Firm* — Jared L. Montanaro

(57) ABSTRACT

A data sharing space (DSS) is generated for a base table having a set of rows with stored data. Requests are received to generate tables, each request including a query to the base table. A row from the set of rows is then accessed. The query is then applied to the row to generate results. An index value is then determined and a portion of the row is stored in the DSS based on the index value.

13 Claims, 8 Drawing Sheets

(56) References Cited

U.S. PATENT DOCUMENTS

2015/0019583 A1* 1/2015 Mittelstadt ........ G06F 17/30442
                                                    707/765
2015/0154254 A1* 6/2015 Mittelstadt ........ G06F 17/30442
                                                    707/765

OTHER PUBLICATIONS

Konik et al., "Generating and Accessing a Data Table", U.S. Appl. No. 14/467,347, filed Aug. 25, 2014.
List of IBM Patents or Patent Applications Treated as Related.
IBM, "Materialized Views with Access Control: Towards Authorization-Aware BI Applications", IP.com Prior Art Databse Technical Disclosure, IP.com No. IPCOM000176069D, Published Nov. 4, 2008. http://ip.com/IPCOM/000176069.
IBM, "&It;QMProject>Method of Recommending a Consolidated Set of Materialized Query Tables", IP.com Prior Art Database Technical Disclosure, IP.com No. IPCOM000193441D, Published Feb. 24, 2010. http://ip.com/IPOM/000193441.
Mell et al, "The NIST Definition of Cloud Computing", Recommendations of the National Institute of Standards and Technology, Sep. 2011, 7 pages, NIST Special Publication 800-145, U.S. Department of Commerce, Gaithersburg, MD.
Konik et al., "Generating and Accessing a Data Table", Filed Jun. 12, 2014.

* cited by examiner

GENERATING AND ACCESSING A DATA TABLE

BACKGROUND

The present disclosure relates to data storage systems, and more specifically, to generating and accessing a data table using queries and an index.

Data can be stored in and accessed from a database. In various embodiments, a database, such as a base table, has rows of data that can be accessed using queries. A query can be one or more statements interconnected with logical operators. The base table can be queried to obtain a result (data) to the query. In certain embodiments, a base table can contain large amounts of data and the time it takes to return a result to a query can be significant. Furthermore, in particular embodiments, the same data can be accessed multiple times. As a result, the same or similar queries can be used multiple times.

SUMMARY

According to embodiments of the present disclosure, a method is disclosed for generating data sharing space (DSS) for a base table having a set of rows with stored data. In various embodiments the method may include receiving a set of requests to generate tables, each request including a query to the base table. The method may also include accessing a row from the set of rows. In addition, the method may include applying each query to the row to generate a set of query results. Also, the method may include determining an index value for the row based on the query results. Furthermore, the method may include storing, based on the index value, at least a portion of the row in the DSS.

According to embodiments of the present disclosure, a database manager is disclosed for generating data sharing space (DSS) for a base table having a set of rows with stored data. In various embodiments, the database manager may be configured to receive a set of requests to generate tables, each request including a query to the base table. The database manager may also be configured to access a row from the set of rows. In addition, the database manager may be configured to apply each query to the row to generate a set of query results. Also, the database manager may be configured to determine an index value for the row based on the query results. Furthermore, the database manager may be configured to store, based on the index value, at least a portion of the row in the DSS.

According to embodiments of the present disclosure, a computer program product is disclosed for generating a data sharing space (DSS) for a base table having a set of rows with stored data. In various embodiments, the computer program product may be configured to receive a set of requests to generate tables, each request including a query to the base table. The computer program product may also be configured to access a row from the set of rows. In addition, the computer program product may be configured to apply each query to the row to generate a set of query results. Also, the computer program product may be configured to determine an index value for the row based on the query results. Furthermore, the computer program product may be configured to store, based on the index value, at least a portion of the row in the DSS.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
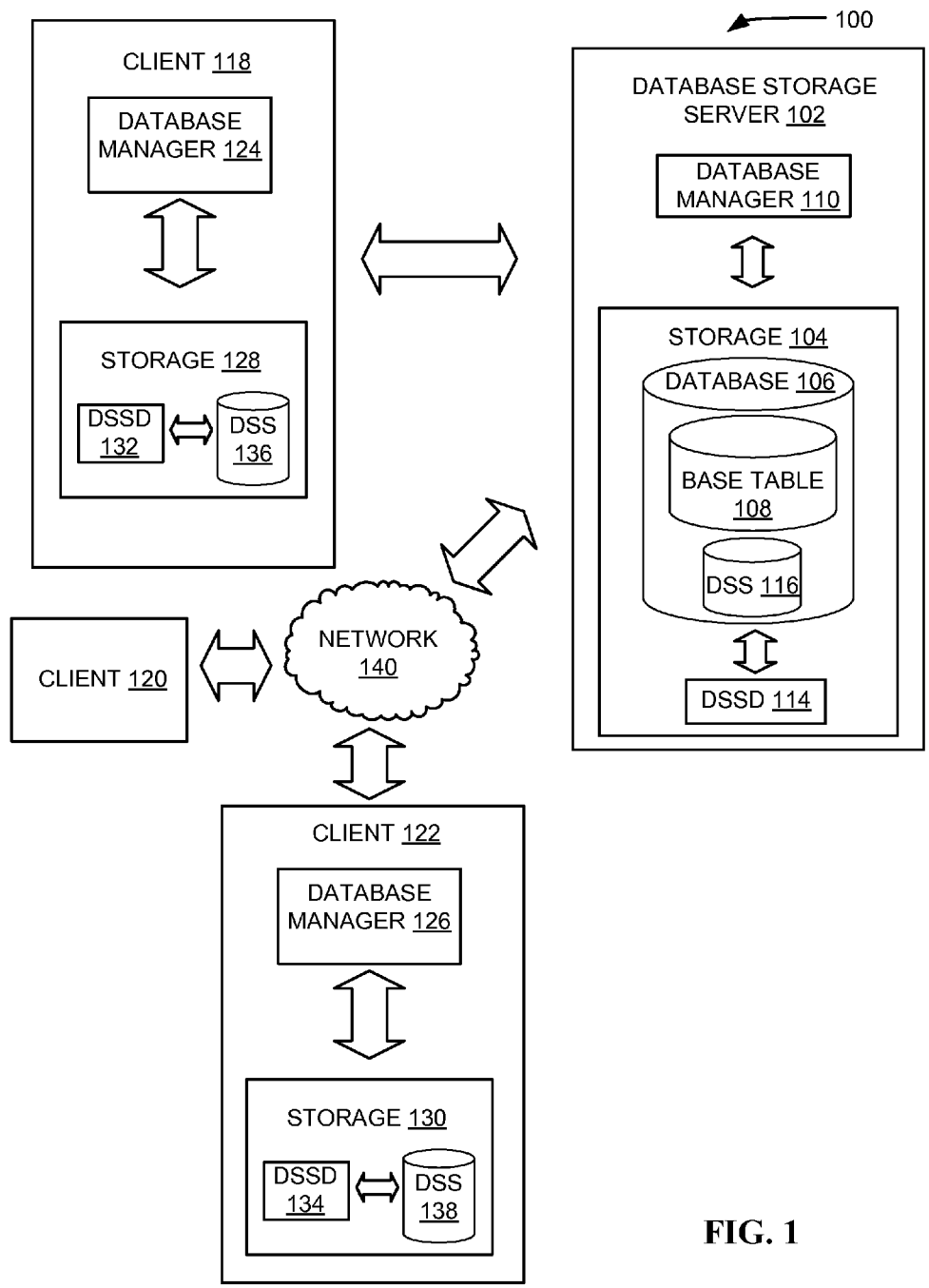
FIG. 1 depicts a system for generating and accessing data sharing spaces (DSS) for a base table, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data storage systems, more particular aspects relate to generating and accessing a data table using queries and an index. While the present disclosure is not necessarily limited to such applications, various aspects of the disclosure may be appreciated through a discussion of various examples using this context.

According to various embodiments, a base table can be a temporary table or result set generated from a query over one or more tables. These base tables can be useful to save time and effort. In particular embodiments, the base table can contain results to queries that are similar or have something in common. For example, a base table can be joined from the same tables or created using the same or similar group criteria. In certain embodiments, there can be complex or large amounts of data in a base table. Materialized query tables (MQTs) are tables that can contain information that is derived and summarized from base tables. MQTs can be created with rows to store the results (data) of queries made multiple times (common queries) in a more convenient storage location (e.g., a faster or otherwise more easily accessible storage space) by avoiding redundant performance of scanning, aggregation and join operations.

In certain embodiments, database managers can implicitly create MQTs for common queries. For example, if a query is made multiple times by many users to a base table, database managers can implicitly create a MQT for the query. When the query is made again, the database manager can direct the query to select the rows from the MQT rather than the base table. In another embodiment, MQTs can be created by human administrators for common queries. As a result, multiple MQTs can be created for some or all of the data that is located in a base table. Thus, when a common query is made, the time can be reduced retrieving the data from the storage location of the corresponding MQT, which can provide faster access times than retrieving the data from the base table.

According to various embodiments, multiple MQTs can provide results to multiple queries. However, the results may have originally been located in the same row of the base table. Therefore, a MQT can contain a row from the base table that is also contained in another MQT.

Embodiments of the present disclosure are directed toward generating and accessing database tables that can be stored in a temporary, or cached, memory space, referred to herein as data sharing spaces (DSS). The database tables can contain the rows for multiple MQTs and therefore, rows from the base table. In particular embodiments, a row may contain a large amount of data and storing the row multiple times may reduce the performance of the system where the MQTs are stored and can also use a large amount of storage or memory space. By storing data rows in the DSS and using an index to map the data row locations, a row that is in more than one MQT can be shared between the different MQTs. Therefore, the storage of the same rows for multiple MQTs can be avoided and the results to common queries can still be provided without having to be directed to the base table.

Various aspects of the current disclosure are directed to a set of common queries being made to a base table. A DSS can then be created and the rows from the base table that provide the results to the common queries can be stored in the DSS. An index, herein after referred to as a data sharing space directory (DSSD), can then be configured with index values that map the locations of the rows stored in the DSS. As a result, when a query is made again, the database manager can direct the query to the DSS rather than the base table. The rows can then be selected, using the DSSD, from the DSS that belong to the MQT that corresponds to the query.

Consistent with embodiments, multiple common queries can be made to the DSS. The index values of the DSSD can be used to identify the rows in the DSS that belong to multiple MQTs that can provide the results to the common queries. The rows can then be retrieved and the common queries can be applied to the rows. Therefore, in various embodiments, a single row or multiple rows can be shared to provide multiple results to the common queries.

For example, an enterprise may store employee data in a base table. Three common queries may be directed to the base table regarding employee 1. The first query may ask for employee 1's salary, the second query may ask for employee 1's address, and the third query may ask for employee 1's phone number. The result (data) for the three common queries can be located in the same row in the base table. In this embodiment, a database manager can generate three MQTs for each common query. Therefore, MQT 1 can be generated to provide the data for employee 1's salary, MQT 2 can be generated to provide the data for employee 2's address, and MQT 3 can be generated to provide the data for employee 1's phone number. As a result, the same row may be copied to all three MQTs. In this case, various embodiments of the present disclosure can be directed towards a DSS that can store a single version of this same row from the base table. When the common queries are received again, using a DSSD, the MQTs corresponding to the common queries can be used to identify the shared row. Sharing the row between the MQTs in this manner can be particularly useful for alleviating the system from storing the same row multiple times and allowing an efficient response to common queries.

Embodiments of the present disclosure will now be described more fully hereinafter with reference to the accompanying figures. However, there can be several embodiments of the present disclosure and should not be construed as limited to the embodiments set forth. The embodiments disclosed are provided so that this disclosure can fully convey the scope of the invention to those skilled in the art. Therefore, the following detailed description is not to be taken in a limiting sense.

FIG. 1 depicts a system 100 for generating and accessing a DSS for a base table, consistent with embodiments of the present disclosure. As shown, the system can include a database storage server 102, communication network 140, and clients 118, 120, 122.

Various embodiments of the database storage server 102 can include a storage 104 and a database manager 110. Database storage server 102 can allow a computer (e.g., servers, personal computers, and mobile devices) to store large amounts of data that allows a user to search and retrieve specific information in the database storage solution. The storages 104, 128, and 130 can be devices (e.g., single in-line memory modules, dual in-line memory modules, hard disks, magnetic tapes, and compact discs) on which a database 106 and DSS 116, 136, and 138 can be stored. Data stored in the database 106 can be arranged into tables, such that the tables have columns and rows of data. In certain embodiments, a table that can exist in the storage 104 is the base table 108 and the DSS 116.

In particular embodiments, as stated herein, accessing data from the base table 108 can be done using queries. A query can be sent from clients 118, 120, and 122. As shown, in some embodiments, clients 120 and 122 can be communicatively coupled to the data storage server 102 using one or more communication networks 140. The network 140 may include wide area networks (such as the Internet), local area networks that can include one or more servers, networks, or databases, and may use a particular communication protocol to transfer data between the entities included in system 100.

Queries sent from clients 118, 120, and 122 can be logical statements that, according to certain embodiments, can be evaluated by database managers 110, 124, or 126. The queries can then be used to retrieve data from the base table 108. For example, database storage server 102 can be a server that houses the storage 104 that contains data for an enterprise. The base table 108 can contain data about the employees of the enterprise, with columns in the base table that represent the employee's name, address, phone number, gender, and salary. A query can then be used to retrieve the records for all male employees that have a salary greater than $60,000. Similarly, a query can be used to retrieve the records for all employees that have a particular area code or telephone prefix.

Consistent with various embodiments, identical or closely related queries (common queries) can be issued multiple times. To respond to queries, the database managers 110, 124, and 126 may have to perform numerous join operations because the base table contains the data required to provide the results to the queries. When the base table contains large amounts of data, queries directed to the base table can take a long time to execute.

Particular embodiments can have the database manager 110, 124, and 126 store the results of common queries in DSS 116, 136, and 138 The DSS 116, 136, and 138 can contain the rows or a subset of the rows from the base table 108. Therefore, a common query can be received and the results can be stored in the DSS 116, 136, and 138. When the common query is received again, the common query can be directed to the DSS and the DSS can provide the result to the common query. By using the DSS, the time it takes gathering and deriving the data every time a query is directed to the base table 108 can be reduced. In certain embodiments, using a process known as query rewrite, a query can be recognized by database managers 110, 124, and 126 and directed to the DSS 116, 136, and 138 to provide the results to the query.

Furthermore, according to particular embodiments, DSSDs 114, 132, and 134 can be configured with index values that map the locations of the rows stored in the DSS. Therefore, when a common query is made, the row required to provide the result to the common query can be found in the DSS using the DSSD. In addition, multiple common queries can be sent by client 120. In certain embodiments, the DSSD 114 can be used to identify the row or rows in the DSS that are needed to provide the results to each of the common queries. For example, client 120 sends a common query 1 for employees with an annual salary of $60,000 and below, a common query 2 for employees with a certain zip code, and a common query 3 for employees with a certain area code telephone number. Employee 1 can have data that matches each of these queries and the row of data for employee 1 would be stored in the MQT that corresponds to common query 1, the MQT that corresponds to common query 2, and the MQT that corresponds to common query 3. Instead of the row for employee 1 being stored in three separate MQTs, the row can now be stored once in the DSS 116. As a result, database manager 110 can direct client 120's queries to DSS 116 and the DSSD 114 can identify the row in DSS 116 using the index values. Similarly, clients 118 and 122 can send multiple common queries where the results are located in the same row. The common queries can then be directed to DSS 136 and 138 and DSSD 132 and 134 can identify the row using the index values.

Figure 2:
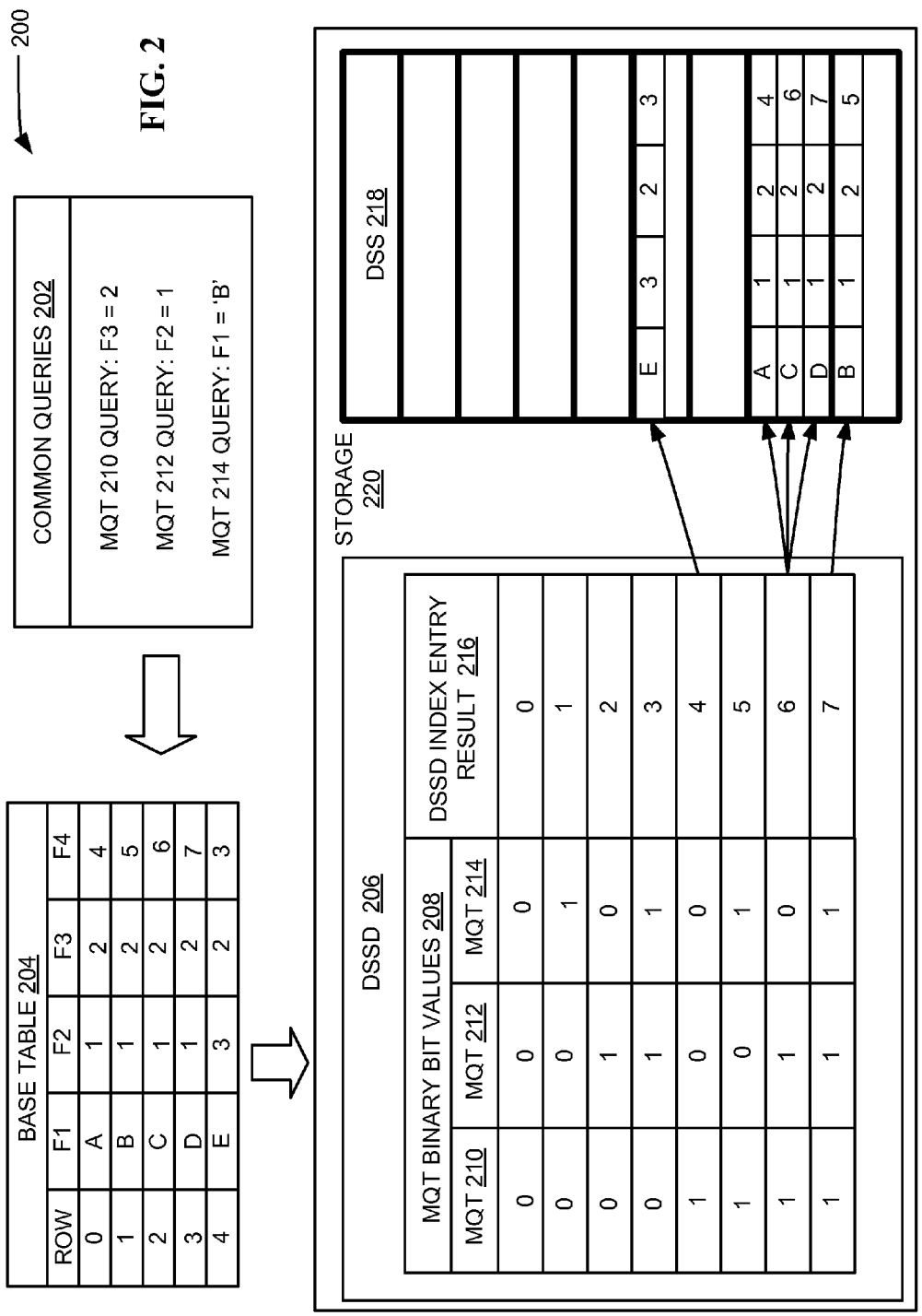
FIG. 2 depicts an example of generating a DSS for a base table, consistent with embodiments of the present disclosure.

FIG. 2 depicts an example 200 of generating a DSS for a base table, consistent with embodiments of the present disclosure. In particular embodiments, as illustrated, the example 200 can include common queries 202, a base table 204, and storage 220. As shown, the storage 220 can include DSSD 206 and a DSS 218. In various embodiments, the queries 202 can include a query for a value of F3, a query for a value of F2, and a query for a value of F1, each query being directed to the base table 204. In certain embodiments, a database manager (e.g., database managers 108, 124, and 126) can determine that all three queries have been sent multiple times and are common queries. Therefore, an MQT should be generated for each query. As a result, DSS 218 will be generated.

According to various embodiments, it can be determined that MQT 210 should be generated for the common query for a value of F3. Therefore, query F3=2 can be directed to the base table 204. In particular embodiments, the base table can be accessed to determine which rows have a value of 2 in column F3. In example 200, all the rows have a value of 2 in column F3. As a result, rows 0-4 return a result of 'true' for the query F3=2. In certain embodiments, the DSSD 206 can be configured with MQT binary bit values 208 that register a 'true' result from the base table as a '1' and a 'false' result from the base table as a '0'. Thus, in example 200, rows 0-4 register a '1' for the MQT 210 binary bit value. Therefore, the possible storage locations for rows 0-4 in the DSS 218 has been reduced from DSSD index entry results (216) 0-7 to DSSD index entry results 4-7.

Similarly, in various embodiments, queries F2=1 (MQT 212) and F1='B' (MQT 214) can be directed to the base table where it is accessed to determine which rows have a value of 1 in column F2 and a value of 'B' in column F1. In example 200, rows 0-3 return a 'true' result for F2=1 and row 4 returns a 'false' result for F2=1. The MQT binary bit values 208 that register a true result for the MQT 212 bit include 2-3 and 6-7. Therefore, the possible storage locations for rows 0-3 in the DSS 218 has been reduced from DSSD index entry results 4-7 to DSSD index entry results 6-7 (where the MQT 210 bit value 208 is true and the MQT 212 bit value 208 is also true) and the possible storage locations for row 4 in the DSS 218 has been reduced from DSSD index entry results 4-7 to DSSD index entry results 4-5 (where MQT 210 bit value is true and MQT 212 bit value is false). Furthermore, in example 200, only row 1 returns a 'true' result for F1='B' and rows 0, 2, 3, and 4 return a 'false' result. Therefore, the storage location for row 1 in the DSS 218 is DSSD index entry result 7 because the binary bit values 208 for MQTs 210, 212, 214 are '1'. Also, the storage location for rows 0, 2, and 3 in the DSS is DSSD index entry result 6 because the binary bit values for MQTs 210 and 212 are '1' and MQT 214 is '0'. In addition, the storage location for row 4 in the DSS is DSSD index entry result 4 because the binary bit value for MQT 210 is '1' and MQTs 212 and 214 are '0'. Rows 0-4 can then be stored accordingly, thereby generating the DSS.

In particular embodiments, the MQTs can be configured with a share parameter. The share parameter can determine whether a MQT will use the DSS and share rows with other MQTs. For example, if MQT 210 is to use the DSS to share a row or rows with MQTs 212 and 214, MQT 210 can have the share parameter set to 'Yes'. Therefore, the rows from the base table 204 that are included in MQT 210 will be stored in DSS 218. However, if MQT 210 is not supposed to use the DSS to share a row or rows with MQTs 212 and 214, MQT 210 can have the share parameter set to 'No'. As a result, the rows from the base table that are included in MQT 210 will be stored in a separate storage space that is reserved for the MQT 210 rows (not shown in FIG. 2).

In various embodiments, the data in the base table may be changed (e.g., some or all of the data in the base table rows are inserted, updated or deleted). To reflect the changes of the data in the base table, the DSS and the MQTs may also be refreshed (e.g., updated or changed). In certain embodiments where the entire DSS is refreshed, the MQTs with a share parameter set to 'Yes' will each have the same refresh schedule. For instance, if MQT 210, 212, and 214 have their share parameters set to 'Yes' then they will be refreshed at a rate that satisfies the refresh requirements of all MQTs. If MQT 210 and 212 have their share parameters set to 'Yes' and MQT 214 has its share parameter set to 'No', then MQT 210 and 212 will be refreshed at a rate that satisfies refresh requirements of both MQT 210 and 212. However, MQT 214 can have a separate refresh rate.

In another embodiment, the system can be configured to identify MQTs that have the share parameter set to 'Yes', but nevertheless, do not share rows with any other MQTs. The identification can be done, for example, by examining index values with null pointers. The refresh rate for these identified MQTs can be set according to their respective requirements (e.g., independent from the other MQTs). Moreover, the remaining MQTs can be refreshed at a rate that is consistent with their respective MQT refresh requirements, but without those identified as not having shared rows. For example, if MQT 214 only has rows stored at DSSD index entry result 1, then MQT does not share rows with either MQT 210 or MQT 212. MQT 214 can have a refresh schedule set according to the specific refresh requirements of MQT 214. MQTs 210 and 212 can be set to a refresh rate that satisfies the requirements of themselves, but not necessarily the requirements of MQT 214.

In yet another embodiment, the refresh schedule can be set for each index value according to the refresh requirement of all of the MQTs that are referred to by the index value. For example, the DSSD index entry result 1 refers only MQT 214, and therefore all rows pointed to by that index value can have a refresh rate determined by the refresh requirements of MQT 214. DSSD index entry result 7, however, refers to all MQTs and the corresponding refresh rate can be set to satisfy the refresh requirements of all MQTs.

In particular embodiments, a MQT can be configured to be user or system defined. This can allow either a user or the system to set the share parameter. For example, MQT 210 is defined to be 'User Maintained' and a user sets MQT 210's share parameter to 'Yes'. Therefore, the rows from the base table that are included in MQT 210 will be stored in the DSS. In addition, MQT 212 is defined to be 'System Maintained' (the database manager may set the share parameter to 'Yes' or 'No') and the system sets MQT 212's share parameter to 'Yes'. As a result, the rows from the base table that are included in MQT 212 will be stored in the DSS.

Figure 3:
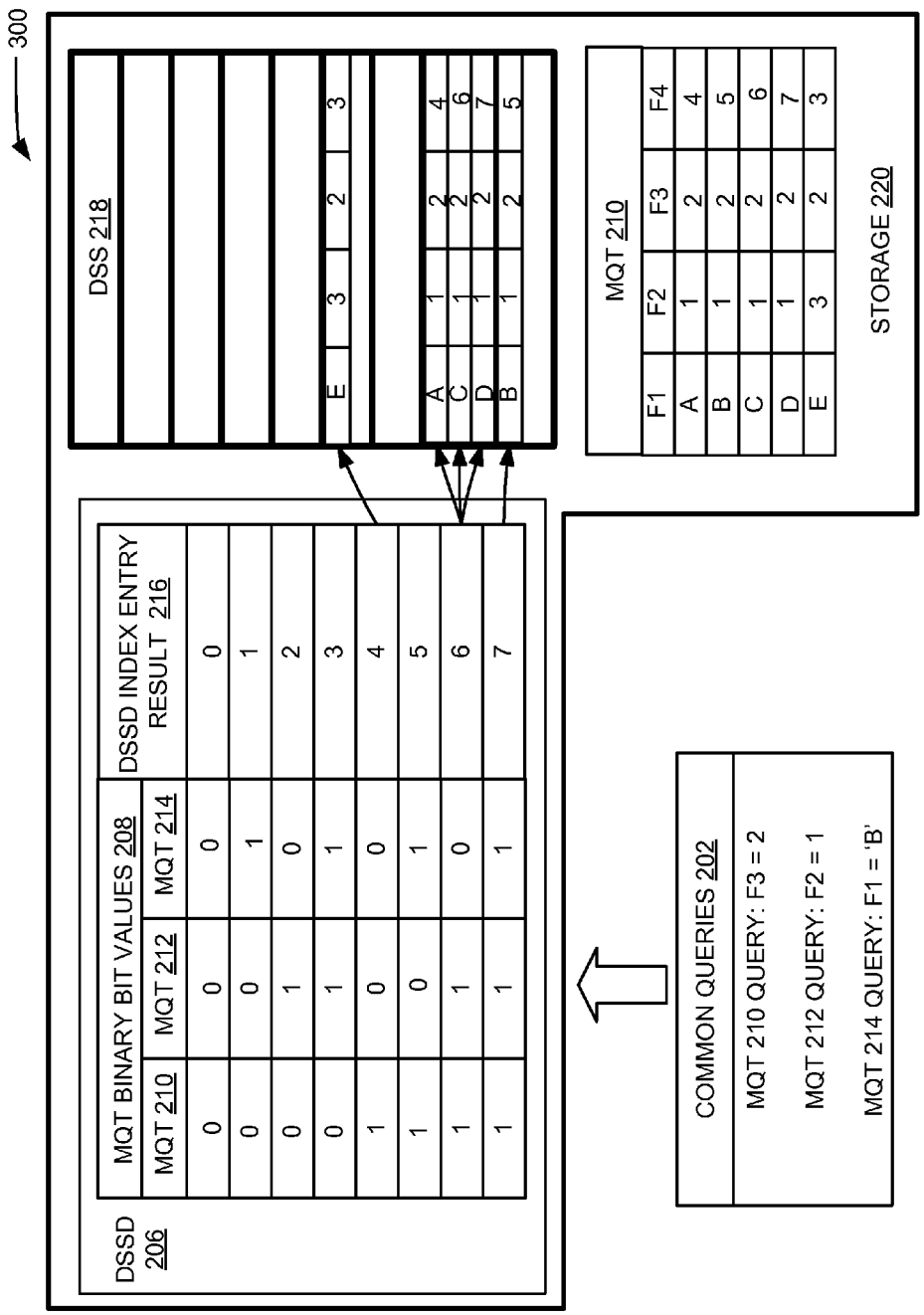
FIG. 3 depicts an example of accessing a DSS for a base table, consistent with embodiments of the present disclosure.

FIG. 3 depicts an example 300 of accessing a DSS for a base table, consistent with embodiments of the present disclosure. In particular embodiments, as illustrated, the example 300 can include common queries 202, a storage 220, and MQTs 210, 212, 214. As shown, the storage 220 can include a DSSD 206 and a DSS 218. In certain embodiments, a database manager (e.g., database managers 108, 124, and 126) can determine that all three queries are common queries and direct the common queries to the DSS 218 in the storage 220.

According to various embodiments, the DSS may be used to store rows from a base table that would otherwise be stored separately for each of MQTs 210, 212, and 214. As a result, the common queries 202 that would be directed to separate storage spaces for each of MQTs 210, 212, and 214 can now be directed to the DSS. For instance, the DSSD 206 can be configured with MQT binary bit values 208. The MQT binary bit values can be used to indicate the results of the common queries for each row. The results can then be used to identify DSSD index entry results 216 that include pointers to the location of the rows in the DSS 218. Therefore, when a common query 202 is received again, the MQT binary bit values 208 can be used again to identify the DSSD index entry results that show where the rows are stored in the DSS. For example, when a common query is directed to a base table, each row may be checked whether the common query matches a value in the row. The MQT binary bit values can then be configured to indicate a match or 'true' result as a '1' value and a non-match or 'false' result as a '0' value. When the common query is received again, this time directed to the DSS 218, the '1' values can be used to identify the DSSD index entry results 216 that show (using pointers) the location in the DSS of the rows that provide a match or 'true' result. In this instance, common query F3=2 is received and would be directed to MQT 210. Therefore, DSSD index entry results 216, corresponding to the MQT binary bit values 208 for MQT 210 that equal 1 are: 4, 5, 6, and 7. The DSSD index entry results 4-7 can each be configured with pointers that can show the location of every row in the DSS that is included in MQT 210. The rows can then be retrieved from the DSS.

Consistent with various embodiments, there may be a large number of MQT tables having rows stored in the DSS 218. This may result in the DSSD index becoming increasingly large and having an increasing number of unused or null entries. Accordingly, the DSSD index can be configured as a sparsely populated index. In this manner, the DSSD index does not need to include pointers for all possible MQT binary bit value combinations. For instance, the MQT binary bit values equal to '1' indicate the DSSD index entry results that contain the pointers to the rows included in the MQT. However, not all DSSD index entry results corresponding to binary bit values equal to '1' will point to a row included in the MQT. As shown in FIG. 3, DSSD index entry result 5 has a MQT binary bit value equal to 1 for MQT 210. However, a row is not stored in the DSS 218 that is indexed by index entry result 5. Therefore, index entry result 5 does not have a pointer and will not give an address when the rows are being retrieved from the DSS.

Similarly, in certain embodiments, common query F2=1 is received and would be directed to MQT 212. The DSSD index entry results 216 that correspond to the MQT 212 bit values that equal 1 are: 2, 3, 6, and 7. The rows identified by pointers for the DSSD index entry results of 2, 3, 6, and 7 can be retrieved from the DSS. In a third example, a query for F1='B' is received and would be directed to MQT 214. The DSSD index entry results 216, corresponding to the MQT 214 bit values equal to 1 are: 1, 3, 5, and 7. Therefore, the rows indicated by pointers for the DSSD index entry results 1, 3, 5, and 7 can be retrieved from the DSS.

As discussed herein, in particular embodiments, the MQTs can be configured with a share parameter. If a MQT has its share parameter set to 'No' then the common queries can be directed to a dedicated storage space for that MQT and not to the DSS. For example, MQT 210 can be configured with a share parameter that is set to 'No'. Therefore, as shown, the common query F3=2 will be directed to a dedicated storage space in the storage 220 for MQT 210 and not DSS 218. Furthermore, also discussed herein, the share parameter can be user defined or system defined and in certain embodiments, can dictate how and when a MQT is refreshed (i.e., updated or changed).

Example 300 in FIG. 3 depicts an embodiment for accessing DSS 218. However, other embodiments exist that can access the DSS. For instance, in describing example 300, a bitmap was used to map the MQT binary bit values 208 to the DSSD index entry results 216 and thereby, retrieve the rows in the DSS to apply the common queries. The DSS queries can be generated using a variety of different formats and languages. For instance, a common query can be defined by Structured Query Language (SQL). SQL defines the syntax for generating and processing queries that can be independent of the structure and format of the DSS. A SQL statement can be used to determine that a query results in an access to DSS 218.

In certain embodiments, selected columns can be retrieved from the DSS. For example, a SQL statement can say "SELECT*where F3=2". Therefore, all columns will be retrieved for the rows where F3=2. In another example, a SQL statement can say "SELECT F3, F2, F1 where F3=2, F2=1, F1='B'". As shown in the base table 204, from FIG. 2, only row 1 has F3=2, F2=1, and F1='B'. Therefore, columns F1, F2, and F3 from the row 1 can be retrieved from the DSS.

Figure 4:
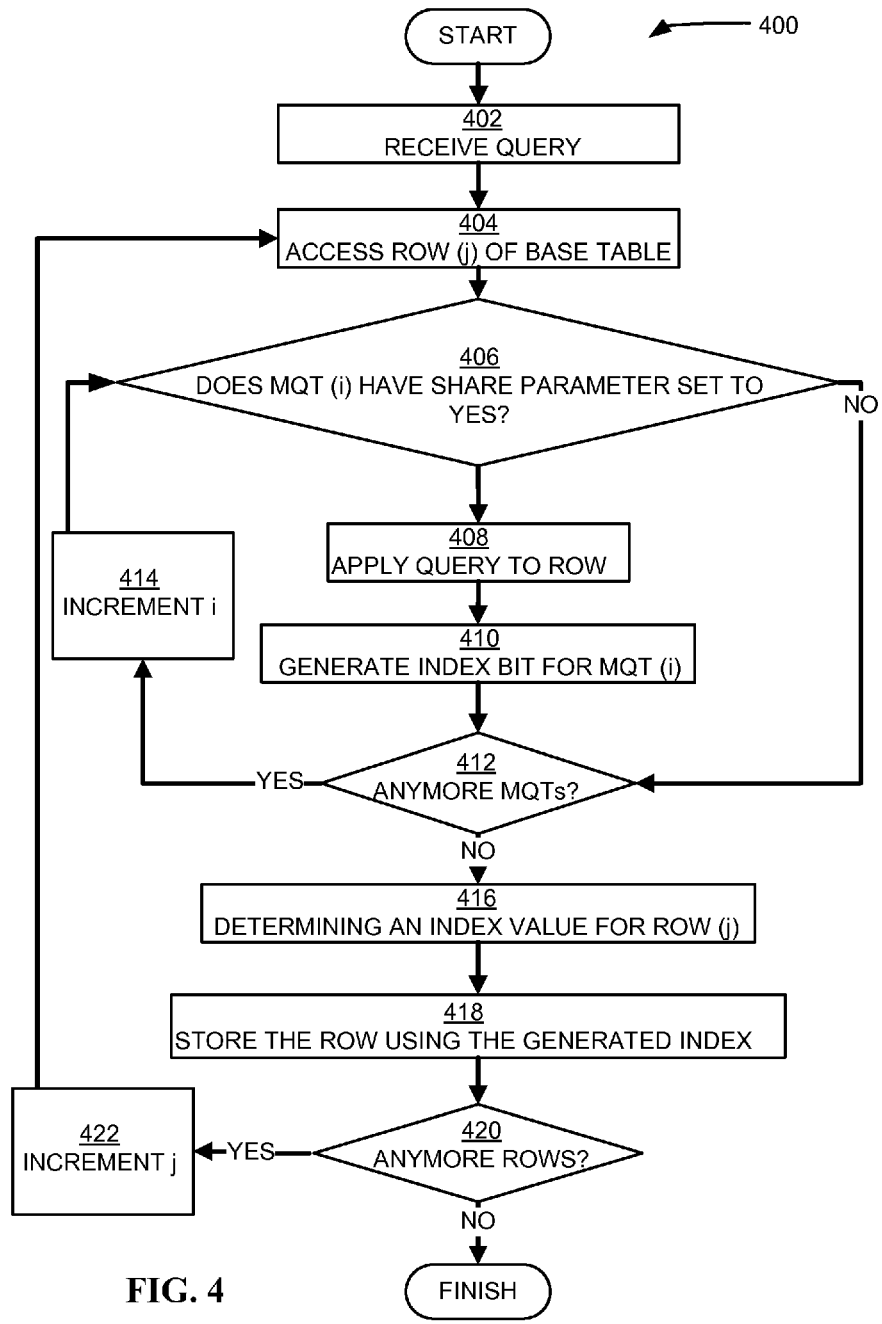
FIG. 4 depicts a method for generating a DSS for a base table having a set of rows with stored data, consistent with embodiments of the present disclosure.

FIG. 4 depicts a method 400 for generating a DSS for a base table having a set of rows with stored data, consistent with embodiments of the present disclosure. In operation 402, a set of queries can be received. As stated herein, a base table can be queried to obtain a result (data) to the query. For common queries, MQTs can be created to store the data of common queries. Therefore, a database manager can implicitly determine upon receiving a set of common queries that a request is made to generate a set of MQTs. However, explicit requests and instructions can also be given to create a set of MQTs for a set of queries.

In operation 404, a row in the base table can be accessed using the set of queries. A base table has rows of data that can be accessed using queries and can be stored in a primary storage device. When a row from the base table is associated with a MQT, it can be designated for storage in a storage device. Accordingly, the time it takes to retrieve the row from the MQT, in comparison with the time it takes to retrieve the row from the base table, can be less.

In operation 406, the MQTs that would be generated for the common queries can be checked to see if they have a share parameter set to 'Yes'. As stated herein, the share parameter can determine whether a MQT will use the DSS and be allowed to share a row with other MQTs. If the MQT is not supposed to use the DSS to share a row or rows with another MQT, then the share parameter can be set to 'No'. As a result, the rows from the base table that are included in the MQT will be stored in a dedicated storage space (e.g. MQT 210 from FIG. 3). However, if a MQT is to use the DSS to share a row or rows with another MQT, the share parameter can be set to 'Yes'. Therefore, the rows from the base table that are included in the MQT will be stored in the DSS.

In operation 408, the set of queries can be applied to the row of the base table. In various embodiments, it can be determined whether the row provides a 'true' result to one query or a 'false' result. The query result can indicate whether a MQT includes the row. Therefore, a MQT can include the row if the row provides a 'true' result to the query. In operation 410, a DSSD can be configured with MQT binary bit values, where a '1' is generated for each query if the row provides a 'true' result and a '0' is generated for each query if the row provides a 'false' result (although the binary values for true and false are arbitrary and can be reversed).

In operation 412, it can be determined if there are anymore MQTs that would be generated from the set of queries. If there are, the method 400 can increment to the next MQT in operation 414 and operations 406-412 can repeat.

In operation 416, the binary bit values are collected from the application of the set of queries to the row and an index value is determined for row(j). In certain embodiments, the DSSD can be configured with a bitmap that determines the index value based on the individual bits generated for each MQT. Therefore, in certain embodiments, the index value can be the decimal value of the combined binary bit values. For instance, index 6 will include a pointer to the location of a row that returned a 'true' result for a first query corresponding to MQT 1, a 'true' result for a second query corresponding to MQT 2, and a 'false' result for a third query corresponding to MQT 3. That is, the MQT binary bit values would be '110'.

In operation 418, the row can then be stored in the DSS according to its index value, and the index value 6 can be updated with a pointer for the appropriate storage location in the DSS. In operation 420, it can be determined if there are anymore rows in the base table to apply the set of queries. If there are, method 400 can increment j to the next row in operation 422 and operations 404-420 can repeat.

Figure 5:
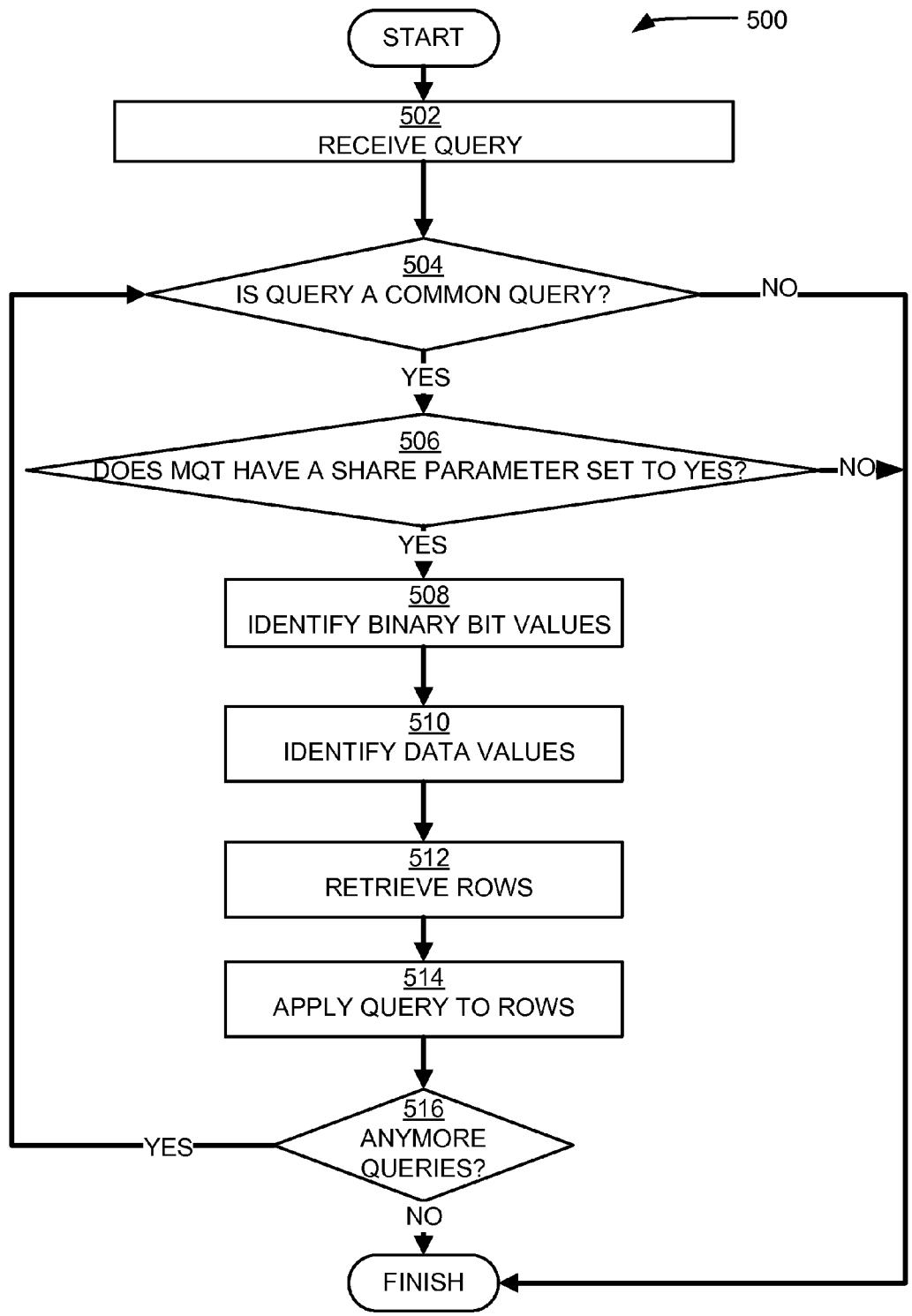
FIG. 5 depicts a method of using an index, data sharing space directory (DSSD), shared between a plurality of tables to access a DSS storing a set of rows from a base table having a plurality of rows with stored data, consistent with embodiments of the present disclosure.

FIG. 5 depicts a method 500 of using an index (DSSD) shared between a plurality of tables to access a DSS storing a set of rows from a base table having a plurality of rows with stored data, consistent with embodiments of the present disclosure. In operation 502, a query can be received. In operation 504, it can be determined if the query is for a MQT (common query). If the query is not a common query, the query may be directed to a base table and method 500 is finished. However, for common queries, the database manager can identify the MQT corresponding to the query.

In operation 506, the MQT that corresponds to the query can be checked to see if it has a share parameter set to 'Yes'. If the MQT is not supposed to share a row or rows with another MQT, then the share parameter can be set to 'No'. As a result, the rows that are included in the MQT will be stored in a dedicated storage space (e.g. MQT 210 from FIG. 3) for the MQT and method 500 is finished (and the query can be satisfied by accessing the dedicated storage space). However, if a MQT has the share parameter set to 'Yes,' then the rows that are included in the MQT will be stored in the DSS and the process can proceed to operation 508.

In operation 508, binary bit values for the DSSD are identified. The binary bit values can represent whether or not a particular MQT includes rows from a base table. For example, the binary bit for the MQT that corresponds to the query has a value of '1'. In operation 510, the data values for the DSSD can then be identified. In this example, the binary bit value of '1' for the MQT can indicate the data values that index where the rows included in the MQT are stored. The data values can then be configured with index elements that point to the rows included in the MQT.

In operation 512, the rows can be retrieved from the DSS using the storage locations determine by the pointers associated with the data values. Consistent with various embodiments, as stated herein, the DSSD index can be configured as a sparsely populated index. In this manner, the DSSD index does not need to include pointers for all possible MQT binary bit value combinations.

In operation 514, the query can then be applied to the retrieved rows. In operation 516, it can be determined if there are anymore queries. If there are, operations 504-514 can repeat.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
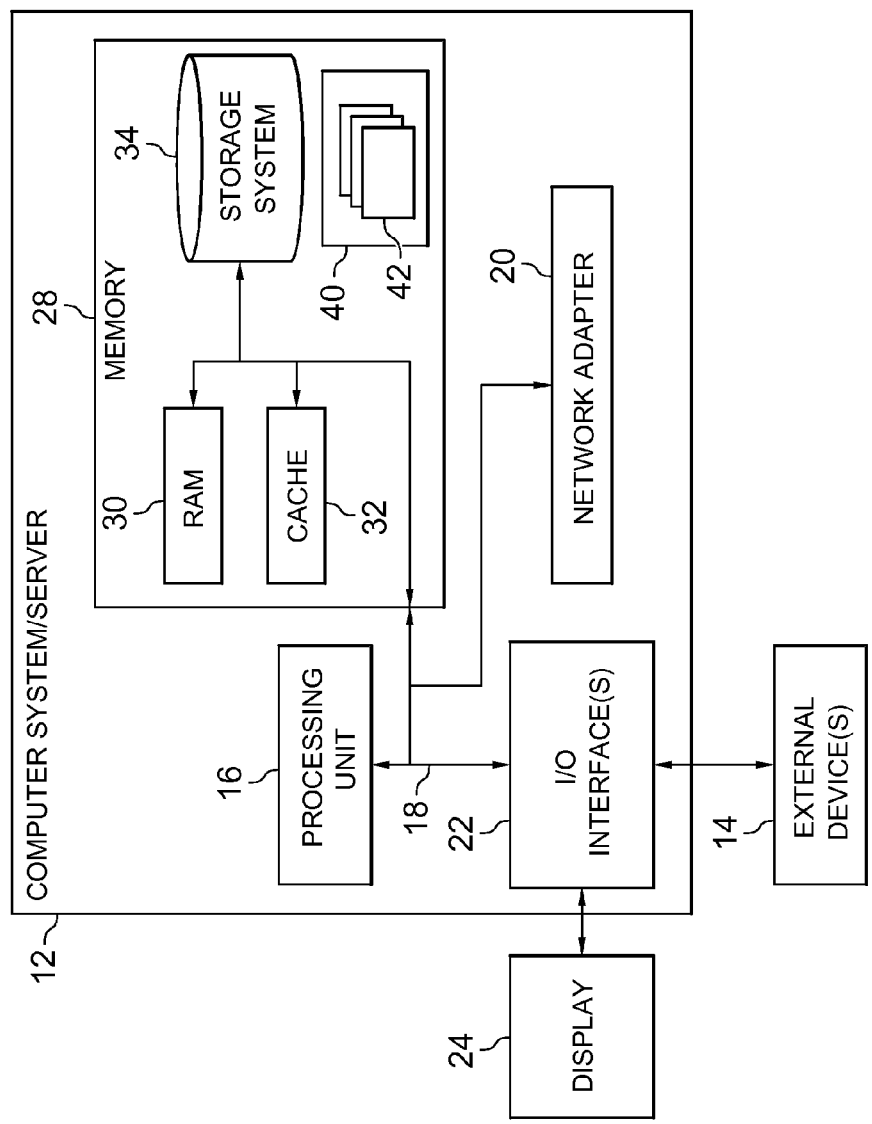
FIG. 6 depicts a cloud computing node, according to an embodiments of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein above.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
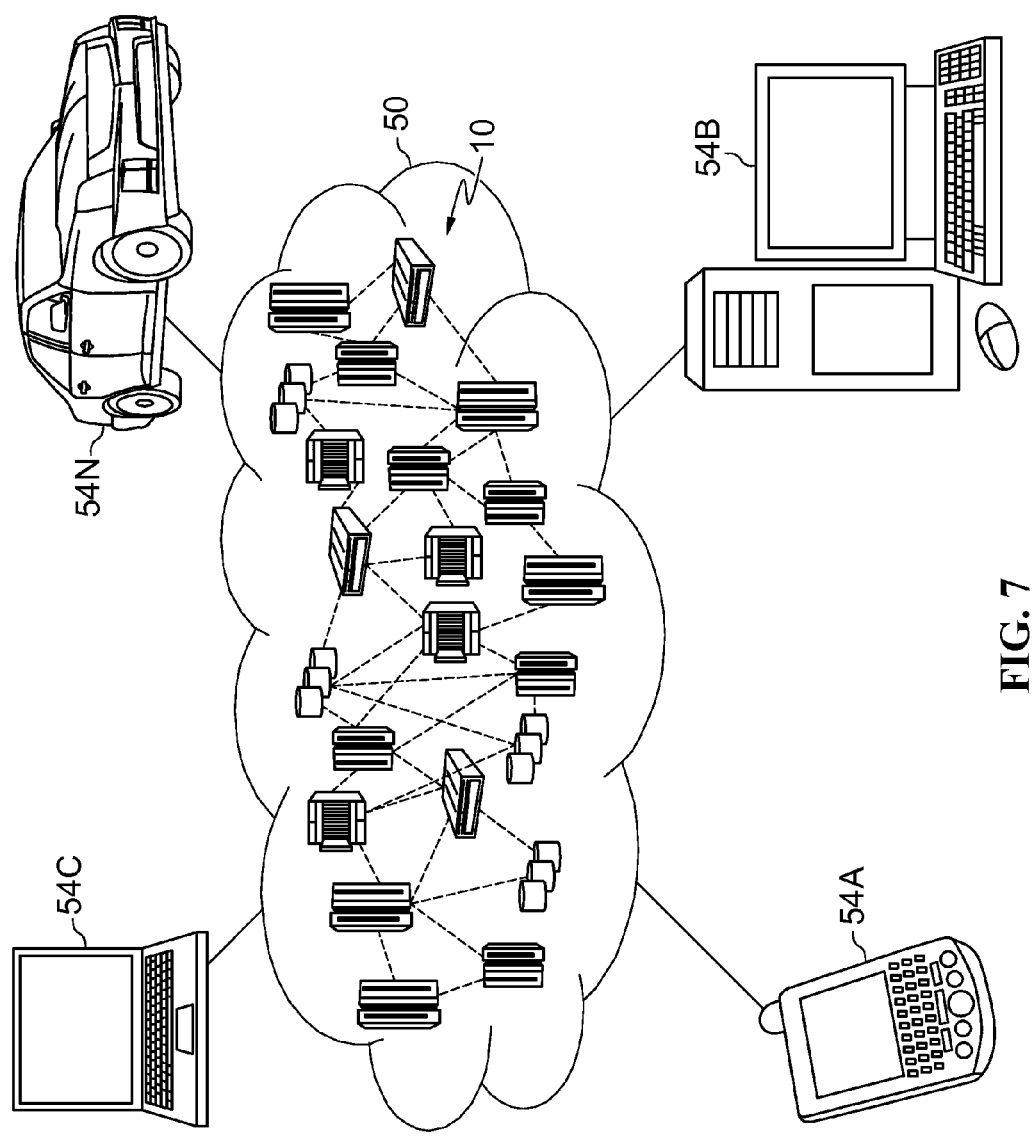
FIG. 7 depicts a cloud computing environment, according to embodiments of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
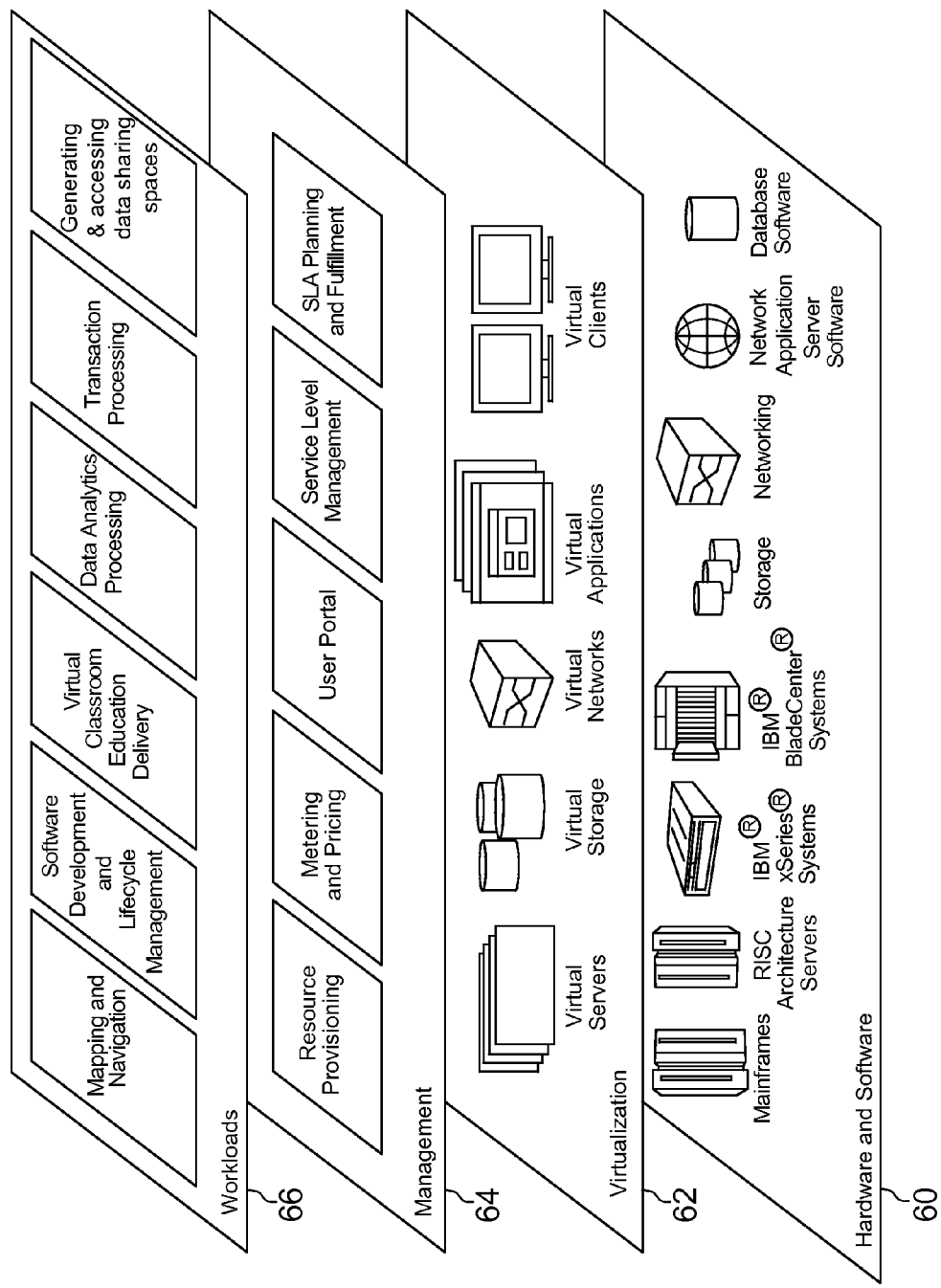
FIG. 8 depicts abstraction model layers, according to embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided: Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and generating and accessing data sharing spaces.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A database manager for generating a cached memory space, wherein the cached memory space is a data sharing space (DSS) for a base table having a set of rows with stored data, the database manager configured to:

receive a set of requests to generate tables, each request including a query to the base table, wherein the set of requests includes a first query to generate a first table, a second query to generate a second table, and a third query to generate a third table;

access a row from the set of rows;

apply each query to the row to generate a set of query results, wherein the first table and the second table include a same row from the base table as a query result;

determine an index value for the row based on the query results;

store, based on the index value, at least a portion of the row in the DSS, wherein the index value is used to map a location of the portion of the row stored in the DSS;

store the same row in the DSS;

determine that the first query, the second query, and the third query are a common query; and direct, in response to determining that the third query is the common query, the third query to the DSS to retrieve the same row.

2. The database manager of claim 1, wherein the index value is configured to indicate which tables include the row.

3. The database manager of claim 1, wherein each query result from the set of query results is configured to generate an individual binary bit value that is configured to indicate whether a table from the tables, corresponding to the individual binary bit, includes the row.

4. The database manager of claim 1, wherein receiving a set of requests to generate tables includes requests to update the tables.

5. The database manager of claim 1, further configured to:
check a table from the tables for a share parameter in response to accessing the row.

6. The database manager of claim 5, wherein the share parameter is configured to determine that the at least a portion of the row is stored in the DSS.

7. The database manager of claim 5, wherein the share parameter is configured to determine that the table is to be updated.

8. A computer program product configured to generate a cached memory space, wherein the cached memory space is a data sharing space (DSS) for a base table having a set of rows with stored data, the computer program product comprising a computer readable storage medium having program code embodied therewith, the program code comprising computer readable program code configured to:

receive a set of requests to generate tables, each request including a query to the base table, wherein the set of requests includes a first query to generate a first table, a second query to generate a second table, and a third query to generate a third table;

access a row from the set of rows;

apply each query to the row to generate a set of query results, wherein the first table and the second table include a same row from the base table as a query result;

determine an index value for the row based on the query results;

store, based on the index value, at least a portion of the row in the DSS, wherein the index value is used to map a location of the portion of the row stored in the DSS;

store the same row in the DSS;

determine that the first query, the second query, and the third query are a common query; and direct, in response to determining that the third query is the common query, the third query to the DSS to retrieve the same row.

9. The computer program product method of claim 8, further configured to:
indicate which tables include the row using the index value.

10. The computer program product of claim 9, further configured to:
generate an individual binary bit value using each query result from the set of query results; and
indicate a table from the tables, corresponding to the individual binary bit, includes the row.

11. The computer program product of claim 8, wherein receiving a set of requests to generate tables includes requests to update the tables.

12. The computer program product of claim 8, further configured to:
check a table from the tables for a share parameter in response to accessing the row.

13. The computer program product of claim 12, further configured to:
determine at least a portion of the row is stored in the DSS using the share parameter.

\* \* \* \* \*